United States Patent
Hu et al.

(10) Patent No.: US 11,551,328 B2
(45) Date of Patent: *Jan. 10, 2023

(54) GRAPHICS ENERGY PROFILING SYSTEM AND METHOD

(71) Applicant: Purdue Research Foundation, West Lafayette, IN (US)

(72) Inventors: Yu Charlie Hu, West Lafayette, IN (US); Ning Ding, Santa Clara, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,306

(22) Filed: Nov. 23, 2021

(65) Prior Publication Data

US 2022/0084158 A1 Mar. 17, 2022

Related U.S. Application Data

(63) Continuation of application No. 16/853,709, filed on Apr. 20, 2020, now Pat. No. 11,200,637, which is a continuation of application No. 16/392,561, filed on Apr. 23, 2019, now Pat. No. 10,628,912.

(60) Provisional application No. 62/661,314, filed on Apr. 23, 2018.

(51) Int. Cl.
*G06T 1/20* (2006.01)
*G06F 9/451* (2018.01)
*G06F 11/30* (2006.01)
*G06F 1/28* (2006.01)

(52) U.S. Cl.
CPC .................. *G06T 1/20* (2013.01); *G06F 1/28* (2013.01); *G06F 9/451* (2018.02); *G06F 11/3024* (2013.01); *G06F 11/3058* (2013.01); *G06T 2200/24* (2013.01)

(58) Field of Classification Search
CPC ......... G06T 1/20; G06T 2200/24; G06F 1/28; G06F 9/451; G06F 11/3024; G06F 11/3058; G06F 2201/865; G06F 11/302; G06F 11/3062
See application file for complete search history.

(56) References Cited

U.S. PATENT DOCUMENTS

| | | | |
|---|---|---|---|
| 10,133,557 B1* | 11/2018 | Tripathi | G06F 1/329 |
| 10,180,857 B2* | 1/2019 | Choi | G06F 9/4893 |
| 2016/0093239 A1* | 3/2016 | Wang | G06F 1/32 |
| | | | 345/55 |

* cited by examiner

*Primary Examiner* — Jacinta M Crawford
*Assistant Examiner* — Andrew Shin
(74) *Attorney, Agent, or Firm* — Piroozi-IP, LLC

(57) ABSTRACT

A method for profiling energy usage in graphics user interfaces (UI) in handheld mobile devices is disclosed, which includes quantifying the central processing unit (CPU) energy drain of each UI update, quantifying the graphics processing unit (GPU) energy drain of each UI update, quantifying the number of pixels changed due to each UI update, identifying an UI update that consumes energy drain but results in no pixel changes to the displayed frame as a graphics energy bug.

10 Claims, 17 Drawing Sheets

| # | View | Num of frames | No change frames | Little change frames | Normal frames | CPU energy (uAh) | GPU energy (uAh) | Total energy (uAh) |
|---|---|---|---|---|---|---|---|---|
| 1 | CancellableSeekBar id/seekbar | 836, 95% | 729 | 0 | 107 | 194, 45% | 1288, 97% | 1482, 84% |
| 2 | StateListAnimatorImageButton id/btn_play | 14, 2% | 9 | 0 | 5 | 5, 1% | 7, 0% | 12, 1% |
| 3 | SuppressLayoutTextView id/time_position | 28, 3% | 6 | 0 | 22 | 5, 1% | 4, 0% | 9, 1% |

Spotify

FIG. 7a

| View | Num of frames | No change frames | Little change frames | Normal frames | CPU energy (uAh) | GPU energy (uAh) | Total energy (uAh) |
|---|---|---|---|---|---|---|---|
| 1 | NowPlayingView id/mini_player_content | 58, 50% | 30 | 0 | 28 | 15, 16% | 90, 29% | 105, 26% |
| 2 | BufferingProgressBar id/progress_bar | 31, 27% | 1 | 0 | 30 | 4, 5% | 15, 5% | 19, 5% |
| 3 | SquareImageView id/album_art | 1, 1% | 0 | 0 | 1 | 5, 5% | 13, 4% | 18, 4% |

Pandora

FIG. 7b

| UI updates call stack | Num of frames | No change frames | Little change frames | Normal frames | Total energy (uAh) |
|---|---|---|---|---|---|
| ...<br>android.view.ViewRootImpl.scheduleTraversals()<br>android.widget.ProgressBar.setProgress()<br>com.spotify.mobile.android.ui.-<br>view.CancellableSeekBar.setProgress()<br>gnx$1.run()<br>izn.doFrame()<br>android.view.Choreographer$CallbackRecord.run()<br>android.view.Choreographer.doCallbacks()<br>android.view.Choreographer.doFrame()<br>1 | 834 | 729 | 0 | 105 | 517, 35% |

FIG. 8

GRAPHICS ENERGY PROFILING SYSTEM AND METHOD

CROSS-REFERENCE TO RELATED APPLICATIONS

The present patent application is a continuation of a U.S. Non-provisional patent application Ser. No. 16/853,709 titled "GRAPHICS ENERGY PROFILING SYSTEM AND METHOD" filed on Apr. 20, 2020 which is a continuation of a U.S. Non-provisional patent application Ser. No. 16/392,561 titled "GRAPHICS ENERGY PROFILING SYSTEM AND METHOD" filed on Apr. 23, 2019 which is related to a co-pending U.S. Non-provisional patent application Ser. No. 16/392,518 titled "SYSTEM AND METHOD FOR ENERGY PROFILING ASYNCHRONOUS API CALLS" filed Apr. 23, 2019; and to a U.S. Provisional Patent Application Ser. No. 62/661,314 filed Apr. 23, 2018, the contents of each of which are hereby incorporated by reference in their entireties into the present disclosure.

STATEMENT REGARDING GOVERNMENT FUNDING

This invention was made with government support under CCF 1320764 awarded by the National Science Foundation. The government has certain rights in the invention

TECHNICAL FIELD

The present application relates to graphics display systems, and more specifically, to a system and method for determining an energy profile for graphics processing units in mobile electronic devices.

BACKGROUND

Modern mobile applications (apps) are UI-centric; for an application (app) to be successful, first and foremost the app needs to have a visually appealing and user-friendly UI design. As such, there has been an escalation in the sophistication of UI designs for popular apps. For instance, PANDORA, a top music streaming app in GOOGLE PLAY, re-designed its user interface in version 7.1 with a more appealing theme and more dynamic transitions, which received positive feedback in major online forums and among its users. The importance is further evidenced by GOOGLE's recent push for MATERIAL DESIGN, a visual language that promotes and directly helps developers with good UI design.

However, visually appealing UI design often comes at a lofty energy cost. A recent study on 55 ANDROID apps identifies 131 most energy-greedy APIs, out of which 49 (37%) fall into the "GUI & Image Manipulation" category.

On modern mobile systems such as ANDROID, to update the screen content, apps simply issue calls to public APIs exposed by UI components, known as UI updates; while the actual graphics rendering process is handled by the framework, which is transparent to app developers. Thus to understand and optimize the energy drain due to app UI updates, app developers need to answer two fundamental questions: Q1: What visual effect did each UI update issued from app source code create, if any? Q2: What is the associated energy cost of each UI update?

Answering these questions, however, is challenging. Apps issuing UI updates to the display hardware displaying updated content goes through the entire graphics rendering process, which is highly complex on modern mobile platforms such as ANDROID for at least four reasons: (1) Crossing the entire vertical system stack: The rendering process involves traversing the entire vertical stack of all system layers from the app, the framework Java code and native code, the OpenGL ES library, and finally to the GPU, before the frames are displayed by the display hardware. (2) Asynchrony across layers: The interactions between adjacent layers are highly asynchronous, e.g., through callback posting and invocation. (3) UI update batching: Multiple UI updates issued by the app within the same display refresh interval (every 16.7 ms) are batched before asynchronously being sent to the framework layer below. (4) "Black-box" GPU: The GPU which renders the actual frames is a "black-box" hardware with closed-sourced drivers and internal command executions independent of the CPU call stacks.

Many mobile app diagnostics tools exist, including app energy profilers and graphics profilers. Such tools can profile method calls, events, and/or resource usage from certain layers, but none of them can perform profiling across the whole vertical system stack and stitch together profiling information across all the layers in order to perform holistic profiling of app UI visual effects and energy drain due to UI updates issued by the app.

The lack of holistic graphics energy profiling tools has led to the gloomy status-quo: by and large developers today are not aware of the energy implications of the UI operations issued by the app, and largely ignore the energy aspect of the UI design. Therefore, improvements are needed in the field.

There is therefore an unmet need to determine energy usage of a graphics UI update and to determine if there are any energy bugs associated with the UI update.

SUMMARY

A method for profiling energy usage in graphics user interfaces (UI) in handheld mobile devices is disclosed. The method includes quantifying the central processing unit (CPU) energy drain of each UI update. Furthermore, the method includes quantifying the graphics processing unit (GPU) energy drain of each UI update. Additionally, the method includes quantifying the number of pixels changed due to each UI update. The method also includes identifying an UI update that consumes energy drain but results in no pixel changes to the displayed frame as a graphics energy bug.

BRIEF DESCRIPTION OF DRAWINGS

FIGS. 7a and 7b are screenshot outputs of the method of the present disclosure in table form for SPOTIFY (7a) and PANDORA (7b).

FIG. 8 is table showing a UI updates page for a trace of SPOTIFY app.

DETAILED DESCRIPTION

Figure 1:
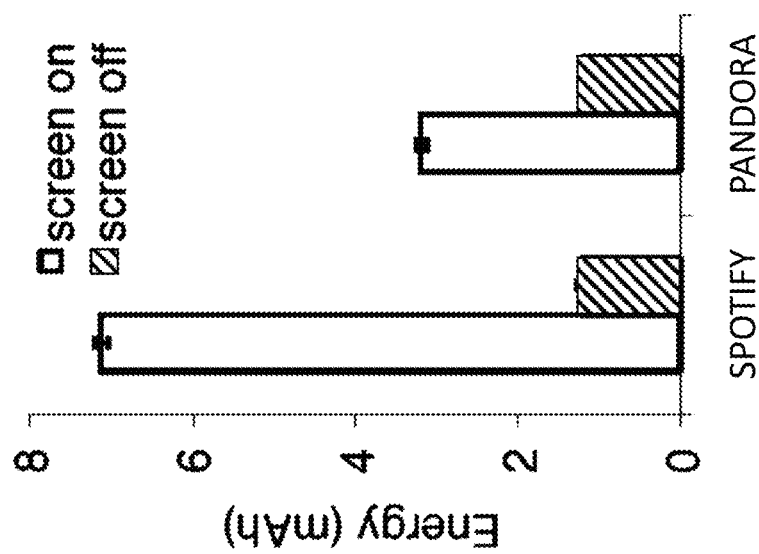
FIG. 1 is a bar graph showing energy in mAh for two popular applications (apps) with and without screens activated.

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method for determining energy usage of a graphics user interface (UI) update is described that can determine energy usage of the graphics UI update and also determine if there are any energy bugs associated with the UI update. The solution of the present disclosure provides improvements to modern day computers and computing devices and in particular to hand-held devices with limited power.

To meet the aforementioned challenges, an energy tool must track asynchrony across all layers of the graphics rendering stack; track the energy drain of method invocations at each system layer, as well as the black-box GPU, and account them to the responsible UI updates; and overcome the UI update batching effect to properly split frame pixel changes and energy drain among batched UI updates.

While the profiling tools of the prior art can profile method calls, events, and/or resource usage from certain layers, none of them can perform profiling across the whole vertical system stack and stitch together profiling information across all the layers in order to perform holistic profiling of app UI visual effects and energy drain due to UI updates issued by the app.

According to one aspect, the present disclosure provides a holistic graphics energy diagnosis system (referred to as GfxDoctor), that helps developers to effortlessly diagnose energy inefficiencies in mobile app graphics at the app source-code level. The system achieves this via quantifying the visual effects (i.e., pixels changed on the screen) resulted from each UI update issued in the app source code, and its associated energy cost in traversing the graphics rendering stack. Such a tool enables developers to (1) understand the visual effect-energy drain tradeoff of the app UI design, and (2) instantly detect graphics energy bugs, which are UI updates in the apps that consume high energy but generate no visual effects.

The system employs the following key techniques

Lightweight view-frame-ID-based information flow tracking: To track the asynchronous dependencies across the layers in the graphics rendering stack while overcoming the UI update batching effect, the presently disclosed system exploits a key observation that a view is effectively the granularity of processing throughout the frame rendering process, and employs a lightweight view-frame-ID tracking technique to track the activities that causally depend on each UI update at all the layers across the graphics rendering stack.

OpenGL record-and-replay: To address the challenge of the GPU being a "black-box" that is fed with batched OpenGL commands due to many UI updates, the presently disclosed system adopts an OpenGL record-and-replay technique followed by frame diffing to account the GPU energy and frame pixel changes in a frame to individual views in the frame, which are further mapped back to corresponding UI updates in the app source code, using the view-to-UI update mapping tracked above. The system therefore performs fine-grained accounting of GPU energy and visual effect.

We have reduced the present disclosure, and in particular, the GfxDoctor tool on CyanogenMod 12.1, which is based on ANDROID 5.1. Our tool works on unmodified apps that use standard view hierarchy for UI rendering, and does not require any changes to the app or access to the app source code. We carefully measured the overhead and accuracy of GfxDoctor using Systrace and a power meter. Our evaluation shows that GfxDoctor logging incurs a reasonably low CPU overhead of 16% on average, the trace size per frame is 184 KB, which is 87% less compared to graphics tools that do not use OpenGL record-and-replay technique (e.g., OpenGL ES Tracer), and GfxDoctor can estimate the UI energy of microbenchmarks performing UI updates, animations, and a mixture of both to be within 14%, 18%, and 25% of power meter readings, respectively.

To demonstrate the effectiveness of GfxDoctor in diagnosing graphics energy problems of mobile apps, we use it to profile a set of 30 popular apps randomly sampled from Google Play. GfxDoctor reveals that three types of graphics energy bugs happen in 8 out of the set of 30 apps, including invisible animation bugs, drawing loop bugs, and no pixel update bugs. Removing these bugs reduces the app energy drain by 46% to 90%.

Two general techniques: view-frame-ID tracking and OpenGL record-and-replay combined with frame diffing enable accurate energy and visual effect accounting at the per-UI update granularity. Case studies of 30 popular ANDROID apps demonstrate the effectiveness of GfxDoctor and the characterization of 3 types of newly found UI energy bugs.

To evidence the need to monitor energy of various applications (apps), reference is made to FIG. 1 which shows energy usage from two popular apps (SPOTIFY and PANDORA). We used a MONSOON power monitor to measure the energy consumption of 1-minute music streaming on a NEXUS 6 phone running ANDROID 5.1. For either app, we streamed a song from a random station. We performed two sets of experiments: with the music player activity running in the foreground, and with the music playback running in the background with screen-off. The phone used WiFi with excellent signal strength. We uninstalled all other apps on the phone and stopped all background activities such as account sync or backup. We chose songs of about 3 minutes long, and measured the energy drain from 60 s to 120 s, so that the song is fully buffered during the measurement period and there is little network activity. Each experiment is repeated 3 times. Since both apps have similar UI and perform the same functionality, we expected their energy drain to be comparable in both sets of experiments. With reference to FIG. 1, energy usage for the two apps (SPOTIFY and PANDORA) are shown while the two apps have similar energy drain with screen off, with screen-on, SPOTIFY consumes 123% more energy than PANDORA. This translates to excess energy usage when various graphics APIs are called.

Since there was no network activity or active use of other phone components such as GPS, the most likely source for energy difference between the two apps is the graphics energy drain. There are a few graphics diagnostic tools such as Systrace and Hierarchy Viewer that help to understand graphics events at the framework level. We next used the most relevant tool—Systrace—to profile both apps' UI rendering. The output of Systrace shows that SPOTIFY generates 3600 frames during 1 minute, while PANDORA only generates 60 frames during the same interval.

The energy usage in FIG. 1 provides proof that various APIs consume more energy than others. This difference in energy usage presents a challenge to developers who are always seeking to lower battery usage from energy-hungry apps.

However, this is about as much help a developer can get from current tools, which is far from enough in terms of identifying energy inefficient graphics UI design and implementation in the app code. In particular, generating more frames and draining more energy by an app do not necessarily indicate energy inefficiency; the reason that SPOTIFY generates more frames than PANDORA could be that it has an energy expensive visual effect that is not in PANDORA. To really understand the reason for the UI energy difference between the two apps, the developer needs to understand the tradeoff involved between visual effects and energy drain, which in turn boils down to answering two fundamental questions: 1) What visual effects did the app create, if any? 2) What is the associated energy cost?

To understand the method of the present disclosure, first some background information about screen rendering is provided. An app frame, or simply a frame, is a single still image of the graphical content of a foreground app on the screen. In ANDROID, the framework employs the CPU and GPU to generate frames for apps running in the foreground. Upon an app launch, the framework will generate an initial frame for the default activity specified by the app, by inflating view hierarchy from the activity's XML layout file. From then on, whenever the app needs to update its screen content, e.g., in response to user interactions, it issues UI updates to the framework and the framework will generate new frames for the app to reflect its content change. We note that no new app frames will be generated if the app does not update its content.

Two types of UI updates are frequently used by apps: one-time UI updates and animations. We next discuss the workflow of ANDROID frame rendering for each type.

Type 1: One-time UI updates.

Figure 2:
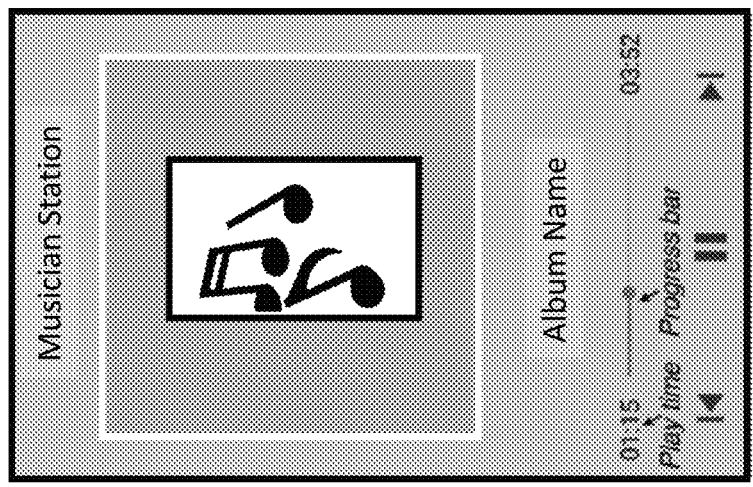
FIG. 2 is a typical user interface for a music player with the play time and progress bar animated.
Figure 3A:
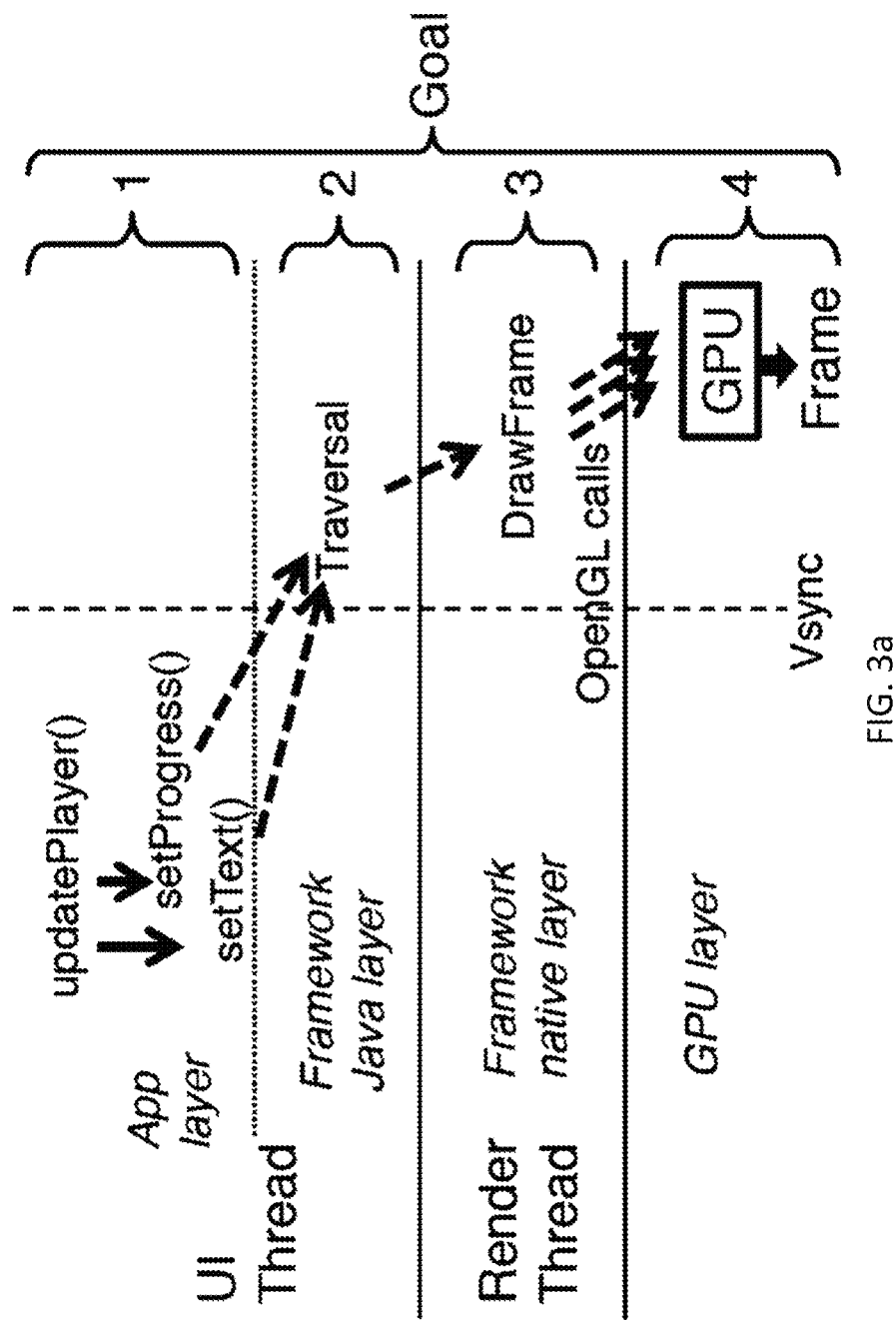
FIGS. 3*a* and 3*b* are schematics showing frame rendering workflow for one-time UI updates (3*a*) and animations (3*b*), where solid and dashed arrows indicate synchronous and asynchronous method calls, respectively.

We use a music player as an example (see FIG. 2) to illustrate the workflow of one-time UI updates in ANDROID, as shown in FIG. 3a. A music player typically periodically updates both the song play time and the progress bar during music playing. We refer to UI components such as the play time text and the progress bar as views, since all UI components are extended from the framework's View class, which represents a single UI element on the screen. To update the two views, the app will invoke a method similar to that shown in Listing 1. To update the play time text, the app first gets a reference to the view object by its pre-defined ID, and then calls its public API TextView.setText( ) to set its new content. The app updates the progress bar in a similar fashion, via the ProgressBar.setProgress( ) API. We refer to an invocation of such a public API exposed by a UI component to set its content and attribute as a UI call, or as an UI update. From the developer's point of view, updating the app's UI is as simple as issuing some UI calls. The actual frame rendering and display updating are performed by the framework, as explained next.

Upon app issuing a UI call, the framework renders a new frame in four steps:

(1) Updating the View Object and Scheduling Rendering a New Frame.

The UI call internally first updates the view object (e.g., updating the string representing the text content in the TextView object, or the integer representing the current progress in the ProgressBar object) and invalidates the view by setting its "dirty" flag. The UI call then schedules rendering of a new frame by posting a Traversal-Runnable callback, a Java Runnable object, to the framework's graphics callback queue. This step happens in the UI thread and runs Java code. Note that if there is already a TraversalRunnable callback posted in the queue, the UI call will not post a new one but will instead share the same callback with previous UI calls. This has important implications for graphics profiling and will be explained in more detail below.

(2) Generating Drawing Commands.

The framework asynchronously (details below) runs TraversalRunnable from the callback queue to start the actual frame rendering. In executing TraversalRunnable, the framework generates drawing commands for all invalidated views, saves them to a data structure called display list, and then posts a DrawFram-eTask callback to the task queue in the Render thread. This step happens in the UI thread and runs mostly framework Java code.

(3) Translating to and Issuing OpenGL Calls.

The Render thread asynchronously runs DrawFrameTask from its task queue which synchronizes frame information from the UI thread, translates the display list into OpenGL ES library calls, and issues OpenGL calls to the GPU. This step happens in the Render thread and runs native code.

(4) Generating Frames

When the Render thread issues OpenGL calls to the GPU, the GPU enqueues the OpenGL commands to its internal command queue, which is independent of the CPU call stacks. The GPU then asynchronously executes commands from its command queue to generate the new frame. This step happens within the GPU. In total, there are four layers involved in the app frame rendering, as numbered in FIG. 3a: the app layer, the framework Java layer, the framework native layer, and the GPU layer. Together, we refer to them as the graphics rendering stack.

Type 2: Animations.

Figure 3B:
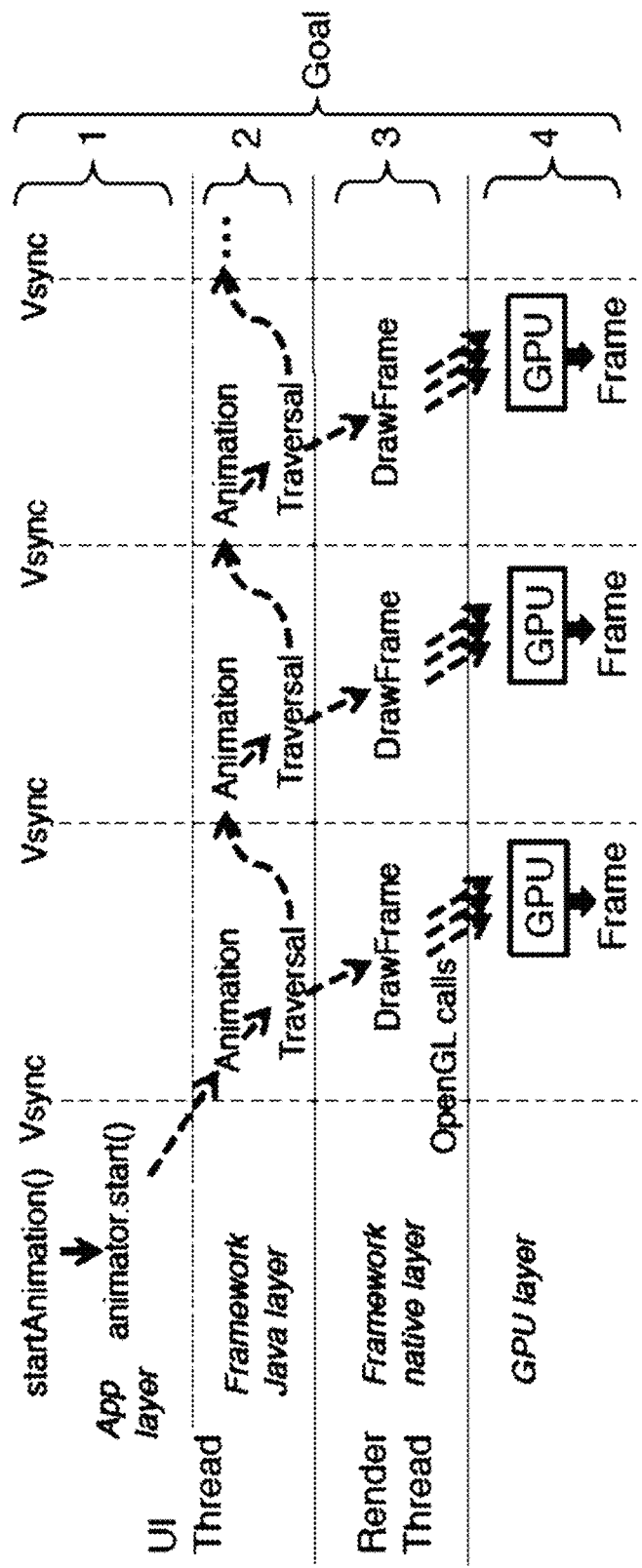

The next type of rendering is animation. Besides one-time UI updates, an app can also start an animation that continuously changes a view over time, e.g., spinning an image, or floating texts from right to left. FIG. 3b shows the workflow for rendering an animation. The app first sets up an animator on the animated view (not shown in the figure) and starts the animation by calling animator.start( ), which posts an AnimationHandler callback to the framework callback queue. The framework will asynchronously run the posted AnimationHandler, which makes per frame change to the animated view to realize the animation effect, e.g., rotating the image by certain degree for an image rotation animation, or changing the text position for a floating text animation. The key difference between one-time UI updates and animations lies in that, an animation does not stop after generating a new frame; instead, during running TraversalRunnable, the framework will automatically post another Animation-Handler callback, which will repeat the above process. In this way, an app only needs to call animator.start( ) once and the framework will handle scheduling and rendering of all future animation frames.

Given the state of the art, and the need for understating what the associated energy drain is in crossing all layers of the rendering stack due to each UI update, two design goals for the method of the present disclosure are provided: 1) quantify the visual effect of each UI update, i.e., the number of pixels changed; and 2) quantify the energy drain of each UI update, i.e., the energy drain spent in traversing the entire frame rendering stack due to each UI update.

Therefore, 4 tasks are set out—Task 1: uncover the causal relationship between each UI update and which view in which frame it updated. The reason we need the view information inside a frame will become clear below; Task 2: identify all method invocations and graphics data generated at all layers of the graphics rendering stack causally related to each UI update. Task 3: identify the pixel changes in each frame due to each UI update. Task 4: aggregate the energy drain of all activities due to each UI update and attribute it to that UI update.

With this backdrop, the three aforementioned challenges are now described. One of the challenges is asynchrony across layers. The graphics rendering workflow is highly asynchronous (as discussed herein): UI updates from the app layer post a TraversalRunnable callback to be asynchronously invoked by the framework Java layer; the framework Java layer in turn posts a DrawFrameTask call-back to be asynchronously invoked by the framework native layer; finally, the framework native layer issues OpenGL calls that are asynchronously executed by the GPU.

The asynchrony across layers effectively avoids lower layer processing blocking the upper layer and thus improve the responsiveness and smoothness of the UI. However, it also poses a challenge to graphics profiling—to track the visual and energy impact of a UI update requires tracking the asynchronous dependence across all layers.

Another of the challenges is UI update batching. UI update batching. Smartphone screens typically have a fixed refresh rate of 60 Hz, i.e., 16.7 ms between screen refreshes; on the other hand, apps may issue UI updates at any time and at arbitrary rate. As a result, there can be multiple UI updates between consecutive screen refreshes; generating one frame for each UI update is a waste of computation and energy.

To cap the frame rate to the display refresh rate, the ANDROID framework batches UI updates between consecutive display refreshes and renders only one frame for each batch of UI updates. Specifically, the framework conveniently uses the Vsync signal as the time boundary for each batch. Vsync is a signal sent by the display hardware each time it refreshes the display, i.e., every 16.7 ms for the typical 60 Hz refresh rate. Between two consecutive Vsync signals (denoted as a Vsync interval thereafter), all UI updates share one TraversalRunnable callback (as discussed herein), thus only trigger one frame rendering pass and generate one frame that incorporates changes from all batched UI updates. Conceptually, all UI updates in a batch have asynchronous dependence on TraversalRunnable, as shown in the top group of dashed arrows in FIG. 3a. We refer to this as UI update batching. UI update batching imposes a unique challenge, i.e., how to split a frame's pixels and associated rendering energy among the multiple UI updates that lead to the frame.

Another challenge is the Challenge 3: "Black-box" GPU. The GPU is responsible for executing OpenGL calls to generate frames and consumes a major portion of the frame rendering energy. However, the GPU is a "black-box" hardware with closed-sourced drivers and internal command executions independent of the CPU call stacks. How to account pixels generated by and energy consumed by the GPU due to multiple batched UI updates poses another challenge.

Figure 4:
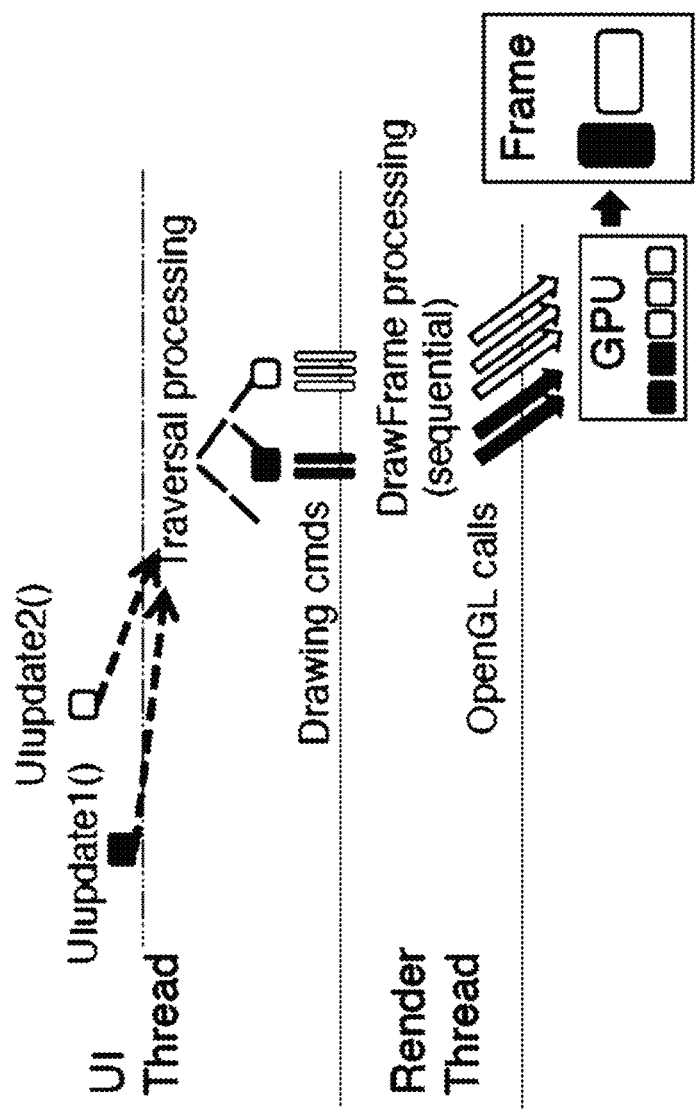
FIG. 4 is a schematic showing principal steps in the method of the present disclosure.

We start with a closer look at the three challenges faced by mapping each frame to the responsible UI updates (Task 1) and identifying all the method invocations at all layers of the graphics rendering stack causally related to each UI update (Task 2) in FIG. 4. The figure shows a typical scenario where multiple UI updates in the same Vsync interval are batched and share a single asynchronous TraversalRunnable callback, which in turn triggers a single asynchronous DrawFrameTask callback, which generates OpenGL calls that are asynchronously fed into the "blackbox" GPU to generate a single frame, which contains updates to the two views that were triggered by the two UI updates. The two accounting goals of GfxDoctor are to (1) account pixel changes in each output frame to UI updates, so that we can quantify the visual effect of each UI update, and (2) split the processing in the framework layers (i.e., during the TraversalRunnable and DrawFrameTask callback) and in the GPU among the two UI updates, so that we can quantify the graphics energy of each UI update.

To track asynchronous dependence across the layers, we can employ a lightweight ID tracking technique similar to that used in AppInsight, by extending the tracking range from app-layer user transactions only to crossing the vertical graphics rendering stack. Specifically, we could assign a numerical ID to the callback runnable object instance each time it is posted, and record the ID upon its invocation. In post processing, the callback invocation that has the same ID as that of a callback posting earlier has asynchronous dependence on the method that posted the callback.

The above ID tracking technique can be applied by assigning a unique frame ID per Vsync interval to track asynchronous dependence between UI updates and the callbacks in the layers below. Such frame-ID tracking, however, cannot split the processing of a single callback that depends on multiple batched UI updates. We make a key observation that a view is effectively the granularity of processing throughout the frame rendering process, from UI updates, to the framework, to the GPU rendering. First, recall that a view represents a UI component on the screen, e.g., a text or a progress bar, and views are the UI programming entities upon which programmers issue UI updates, e.g., the time Text and progress Bar as in Listing 1. Therefore, the granularity of a UI update is always a view, as indicated by the black and white squares below the two UI updates in FIG. 4. Second, a view is also effectively the granularity at which the framework renders a frame. In particular, in the UI thread the TraversalRunnable traverses the app's view hierarchy and processes each invalidated view to generate a group of drawing commands (shown as the black and white vertical bars below Traversal processing) for this view before processing the next invalidated view. In the Render thread, after DrawFrameTask converts drawing commands to OpenGL calls, by default the framework will try to batch OpenGL calls for multiple views into one group to minimize the number of OpenGL calls, i.e., OpenGL calls are not necessarily sent to the GPU in the sequence of one group per view. However, this behavior is configurable. To enable per-view based activity tracking, in GfxDoctor we disable this batching so the OpenGL calls are sent to the GPU one group per view. Third, the GPU internally may process the input sequence of OpenGL calls for different views in parallel. However, our OpenGL record-and-replay technique discussed herein for overcoming the "black-box" effect of the GPU effectively serializes the OpenGL call processing to become one view at a time.

| Listing 1: UI updates to update player time and progress. |
| --- |
| 1  public void updatePlayer( ) { |
| 2      TextView timeText = (TextView) findViewById(R.id.playtime); |
| 3      String playtime = getCurrentPlayTime( ); |
| 4      timeText.setText(playtime); |
| 5 |
| 6      ProgressBar progressBar = (ProgressBar) findViewById(R.id.progress); |
| 7      int progress = getCurrentPlayProgress( ); |
| 8      progressBar.setProgress(progress); |
| 9  } |

Based on the above observation, our key idea is to track view-based information flow throughout the rendering stack. We achieve view-ID tracking via three steps: (1) we instrument the framework to assign each view object a unique numerical ID upon creation, (2) upon each UI update in the app layer, we record the call stack of the UI update along with the ID of the view it is updating, (3) during frame rendering, we label the drawing commands and OpenGL calls generated at each layer with view IDs. Recall UI updates in different Vsync intervals can update the same view (UI component) in different resulting frames. Thus tracking the view ID alone is not enough, and we append the view ID with a frame ID that is unique to each Vsync interval. We call the resulting tracking scheme view-frame-ID tracking. In post processing, GfxDoctor matches UI updates with corresponding processing and drawing commands and OpenGL calls in lower layers by matching the view-frame-ID. Note the view-frame-IDs of different UI updates in a Vsync interval will share the same frame ID. Therefore we can still use the frame ID portion to track the asynchronous dependence between batched UI updates to the corresponding Traversal-Runnable and DrawFrameTask callbacks.

In addition to tracking asynchronous dependence between UI updates issued by the app and the corresponding frame rendering callbacks across the layers below, GfxDoctor also needs to track synchronous control dependence of method calls within each layer, which simply follows from traditional synchronous call graph logging.

Next, we discuss tracking information across GPU. Since the GPU is a "black-box" hardware, we cannot apply frame or view ID tracking to track the asynchronous dependence between the OpenGL calls issued at the framework native layer and the activities inside the GPU. Recall our goal is to account pixels in the output frame and GPU energy to the responsible UI updates. A naive approach would be recording all the OpenGL calls and the frames generated, and tracking their dependence by performing additional logging within the GPU (using OpenGL extensions). The approach has two drawbacks. First, since frames are bitmaps which can be as large as several megabytes each, and since apps can generate up to 60 frames per second, recording raw frames will generate hundreds of megabytes of trace per second, an unacceptable overhead that will affect app behavior. Second, even if we do so, it is difficult to uncover the mapping between OpenGL calls and the pixels in the frame. To tackle the problem, we adopt an OpenGL record-and-replay technique to track the dependence between OpenGL calls and the views updated in each frame. Specifically, we record only the OpenGL calls but not the frames during profiling, and reconstruct the frames by replaying the OpenGL calls on the GPU during post processing. Doing so has three advantages: (1) It greatly reduces the tracing overhead; (2) the dependence tracking become straightforward: each reconstructed frame has dependence with the OpenGL calls that are replayed to generate it, and (3) it also enables accounting frame pixels (part of Task 3) and GPU energy (part of Task 4) to individual UI updates as follows: since view-frame-ID tracking labels a group of OpenGL calls with a corresponding view ID, by replaying OpenGL calls for each view ID at a time, GfxDoctor effectively uncovers the pixels generated for each view; the number of OpenGL draw calls for each view also indicates the view's GPU energy share, which can be used to account the GPU energy to individual views; finally, combined with the view ID label for each UI update from view-frame-ID tracking, GfxDoctor accounts per-view pixels and GPU energy to individual UI updates.

Next, we discuss frame diffing to account for pixel changes. During post processing, to account pixel changes in a frame to corresponding UI updates, GfxDoctor first performs pixel-wise-diffing between the frame and the previous frame to get a list of changed pixels in this frame. Since we also have frame pixels to UI updates mapping from OpenGL-record-and-replay on the GPU (as discussed herein), GfxDoctor can further account each changed pixels to individual UI updates, thus completing Task.

Next, we detail how we calculate the CPU and GPU energy consumed in each layer of graphics rendering stack, and account them to the UI updates. First, we look at the CPU.

CPU

We use well-established utilization-based power model to calculate the CPU energy. A CPU power model takes each core's frequency as input, and outputs the active power of the CPU. To use the CPU model, GfxDoctor logs each CPU core's on/off state and frequency change, as well as the CPU time spent on each frame rendering method during profiling. We calculate the CPU energy of UI updates in rendering a frame in two steps: (1) calculating the CPU energy of each method in the framework Java and native layer, (2) aggregating the CPU energy of the methods to the UI updates that trigger them. If a method is triggered due to multiple batched UI updates to the same view, its CPU energy is evenly split among them. For Step 1, to calculate the CPU energy of a particular method, we also need to know (1) which cores the method has run on, (2) the method's CPU time on each core, and (3) the frequency change of each core. Answering the first two questions requires collecting detailed context switch log, which will impose significant runtime overhead. To avoid such overhead, we resort to the following approximation-based low overhead approach. We log the core ID and perthread-per-core timer upon entering and exiting the method to infer the method's CPU time on each core: if the entering and exiting core IDs are the same, we assume the method has been running on the same core for its entire duration; otherwise, we assume the method's CPU time is evenly split among the two cores. We next look at energy usage in the GPU.

GPU

Similarly as with the CPU, we log the GPU frequency and time spent on each power state during each Vsync interval, and use a utilization-based power model to calculate the GPU energy in each Vsync interval. For each frame, we account its GPU energy to UI updates in two steps: (1) We assume the GPU energy of a frame is evenly split among the OpenGL draw calls of the frame (e.g., among the 5 OpenGL calls in FIG. 6), and use the view ID of OpenGL calls added in view-frame-ID tracking to aggregate their GPU energy into per-view GPU energy drain; (3) Since updated views can be mapped back to triggering UI updates, we can further account per-view GPU energy to the UI updates. If a view is updated by multiple batched UI updates, the GPU energy is evenly split among them.

Next, we discuss reduction to practice of the methodology discussed herein on various devices. We have implemented the GfxDoctor tool on CyanogenMod 12.1, which is based on ANDROID 5.1. First, we discuss system overview of the implementation.

System Overview

Figure 5:
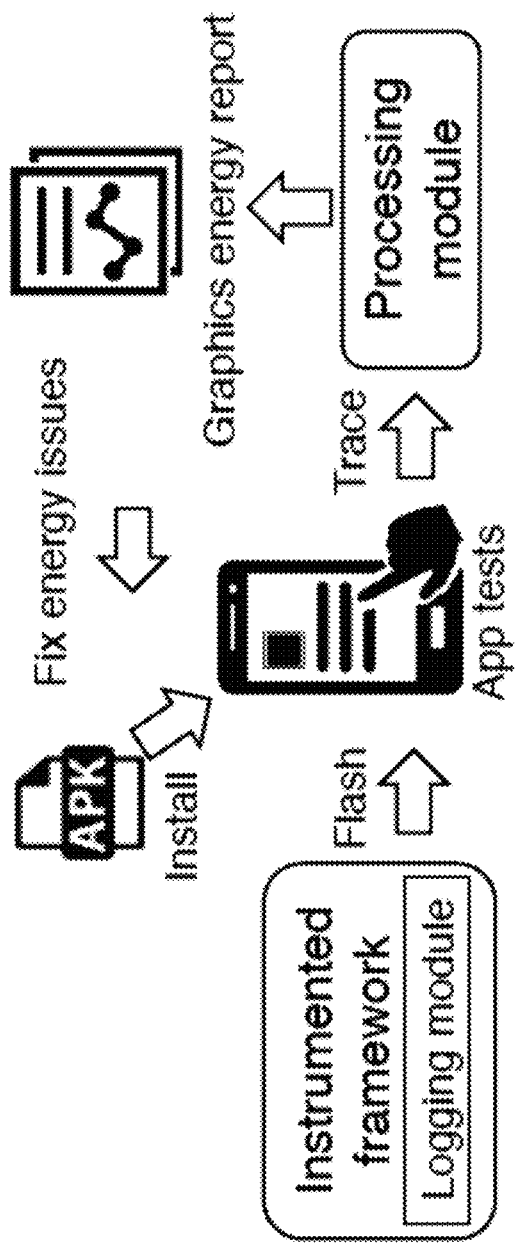
FIG. 5 is a schematic of an overview of systems components performing the method of the present disclosure.

Referring to FIG. 5 a schematic of the implementation is shown which shows an overview of GfxDoctor, including two key components: the logging module, and the processing module. The logging module is incorporated into an instrumented ANDROID framework ROM, which developers need to flash to the test phone; the processing module is a Java program that runs on a host computer (not shown in the figure) that is connected to the testing phone by a USB cable. The method of the present disclosure is used in two phases. In the testing phase, the developer installs the unmodified app on the test phone, connects the phone to the host computer, starts the processing module on the computer to stream traces generated by the logging module, and performs app testing. In the processing phase, the processing module processes the traces and generates a detailed report about the app's graphics performance-energy drain tradeoff during testing.

View-Frame-ID Tracking

We added 600 lines of Java logging code and 50 lines of native logging code in the ANDROID framework.

CPU and GPU Time and Frequency Logging

We log the CPU time of a method by reading per-thread CPU clock (i.e., CLOCK THREAD CPUTIME ID clock) upon entering and exiting the method. Atrace already supports CPU frequency logging. We modify Atrace to additionally support GPU frequency and state logging.

OpenGL Record and Replay.

We use the GPU Debugger for OpenGL commands record and replay. The GPU Debugger provides a wrapper library to intercept OpenGL calls during profiling, and a native server along with a Java client to replay OpenGL calls on GPU and generate frames.

Post Processing.

We implement the processing module in Java with 10K LOC. It mainly involves parsing and correlating traces from each layer and implements frame diffing, pixel accounting and energy accounting logics. With the setup described, we next present the results.

We randomly selected 30 popular apps from 6 app categories in Google Play, as listed in Table 1. All of the apps have over 1 million downloads, and some have over 100 million downloads, e.g., INSTAGRAM and SPOTIFY. We profiled each app using GfxDoctor while performing typical user interactions, e.g., browsing news for news apps and music streaming for music apps. Table 2 shows a summary of the statistics of the profiling output for 8 out of the 30 apps (due to page limit) for which GfxDoctor identified graphics energy bugs (discussed in the next section). We observe that UI updates are highly complex: a less than-1-min run of these apps results in between 555 to 4,054 updates, including 13 to 972 animations, updating up to 40 different views originated from between 65 to 177 unique UI call stacks in the app source code. Such complexity highlights the need for an automatic, source-code level graphics energy profiler such as GfxDoctor. We note that the method according to the present disclosure can work on released apps as well as apps in development. Since app development is an iterative process during which multiple intermediate versions will be developed and tested, developers can use the tool to detect UI energy bugs in the app before release, or compare UI energy drain of multiple versions and choose the one with the best UI feature-energy drain tradeoff.

TABLE 1

Apps used in the profiling study

| Category | Apps |
|---|---|
| Music | Apple music, Spotify, Pandora, Soundcloud, Youtube music |
| News | ABC, BBC, NBC, New York Times, Yahoo News |
| Tools | Power Clean, Psafe total, Clean master, DU Battery Saver, CM Security |
| Shopping | Amazon, Ebay, AliExpress, Walmart, Poshmark |
| Photo | Instagram, Pinterest, Google photos, Photo grid, Photo editor |
| Weather | Weather channel, Go weather, Morecast, Yahoo weather, MyRadar weather |

TABLE 2

UI updates statistics in app traces

| | | # of UI updates | | | # of | Unique |
|---|---|---|---|---|---|---|
| App | trace len (s) | total | one-time | animation | views updated | UI call stacks |
| Instagram 9.3.0 | 30 | 621 | 415 | 206 | 15 | 65 |
| Morecast 3.0.6 | 42 | 1532 | 853 | 679 | 40 | 105 |
| Pinterest 5.22.0 | 28 | 555 | 400 | 155 | 20 | 79 |
| Poshmark 2.48.02 | 55 | 4054 | 4001 | 53 | 34 | 129 |
| Power Clean 2.8.7.18 | 32 | 1429 | 1394 | 35 | 34 | 91 |
| Psafe total 3.6.11 | 30 | 2722 | 2709 | 13 | 24 | 75 |
| Spotify 6.1.0 | 30 | 2629 | 1657 | 972 | 38 | 177 |
| Walmart 4.0.3 | 32 | 1137 | 988 | 149 | 20 | 118 |

Figures 6A, 6B:
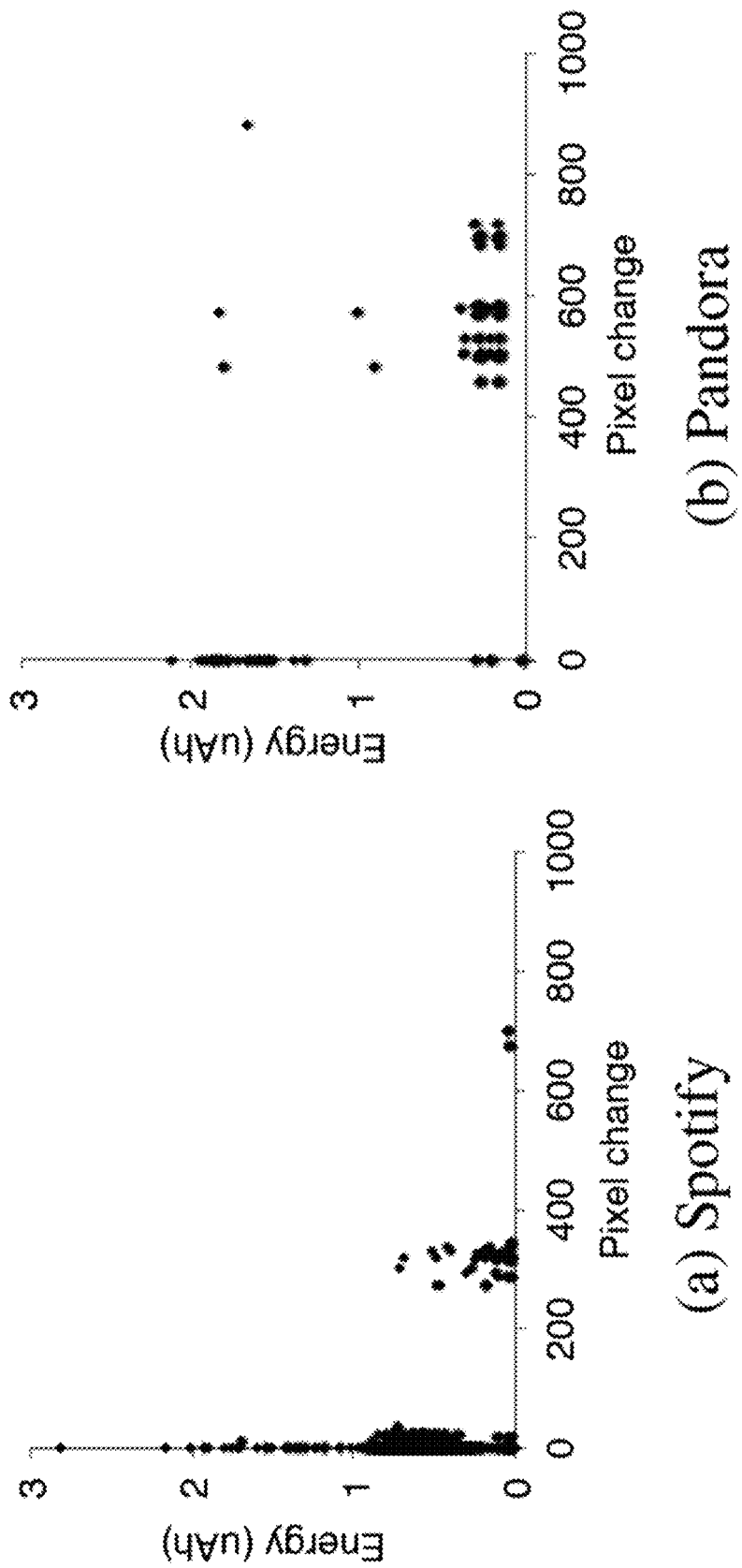
FIGS. 6*a* and 6*b* provide scatter plots of energy usage in µAh per pixel change for SPOTIFY (6*a*) and PANDORA (6*b*).

We demonstrate the three outputs of GfxDoctor and how to use them to diagnose app graphics issues, using two example apps, SPOTIFY and PANDORA, under the same user operation, i.e., music streaming for 30 s. FIGS. 6a and 6b shows the first output format of GfxDoctor—a scatter plot of pixel changes versus energy drain of all the UI updates issued by the tested app, for the two apps. We see that the dots or UI updates are clustered in three regions: (1) Dots that are away from the y-axis represent UI updates with many pixel changes. UI updates in this region do not show obvious energy issues and we refer to this region as the "normal region". (2) Dots close to (but not on) the y-axis represent UI updates with few pixel changes, which indicates potential energy inefficiency. For example, if such pixel changes are so few that they are hardly visible to users, the developer may consider batching or removing them. However, we note that a UI update with few pixel changes does not necessarily contain an energy issue, e.g., app may be updating a small emoji or some small-sized text that conveys important information. Thus UI updates in this region require developers to use their knowledge of the app to determine the visual effect-energy drain tradeoff. We refer to this region as the "tradeoff region". (3) Dots on the y-axis represent UI updates that have no pixel changes but consume energy, which can be safely classified by developers as graphics energy bugs. We refer to this region as the "energy bug region". The scatter plot for SPOTIFY in FIG. 6*a* demonstrates one such "energy bug region" on the y-axis with respect to SPOTIFY; in contrast, the "energy bug region" in PANDORA's scatter plot is much smaller and most of the dots lie within the "normal region".

Figure 9A:
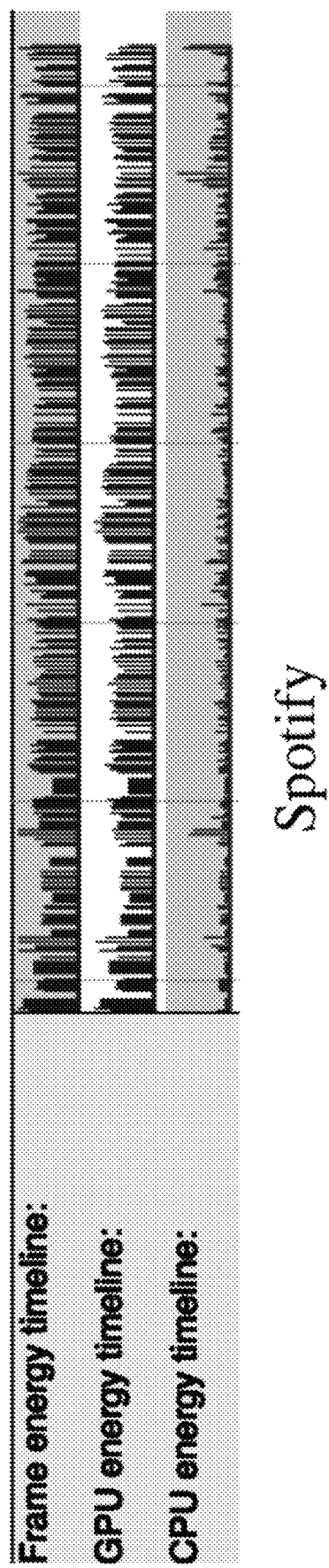
FIGS. 9a and 9b are screenshots of the method of the present disclosure for energy timelines for SPOTIFY (9a) and PANDORA (9b) for 30 s of music streaming.
Figure 9B:
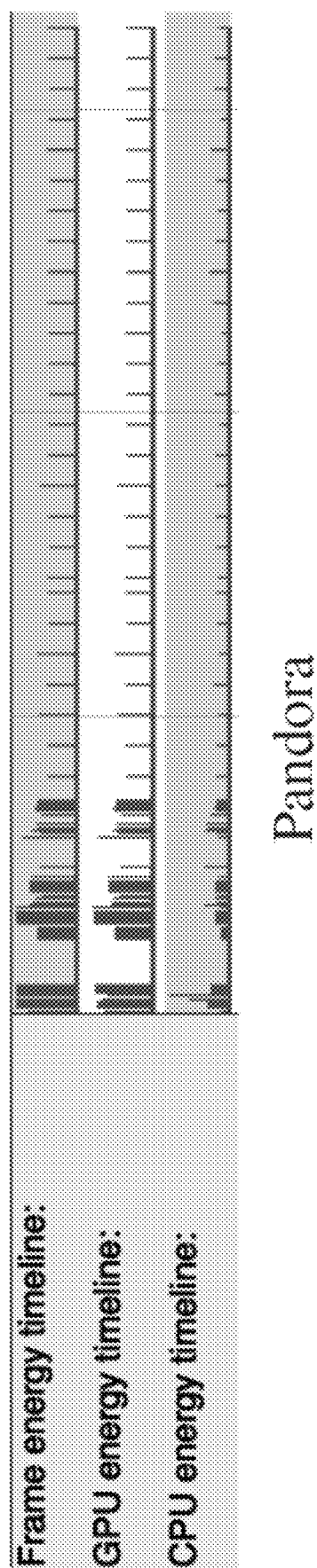

Once GfxDoctor exposes some graphics energy bugs in an app, the natural question would be, what are those UI updates that cause graphics energy bugs and how to fix them? FIGS. 7*a* and 7*b* show the second output format of GfxDoctor provided in a table format. Since the number of UI updates during profiling can be large, the table output displays the UI updates in a two-level hierarchy of webpages: the first level shows the list of views updated during the test, sorted by aggregate graphics energy consumed by all UI updates on the view in descending order; clicking on each view entry will bring the user to the second level webpage, i.e., a list of UI update call stacks, also sorted by graphics energy in descending order, with the number of frames each call stack generated and the total graphics energy consumed. For example, the first row in the table shown in FIG. 7*a* shows that during 30 s music streaming in SPOTIFY, a view with ID "seekbar" is updated 836 times, out of which 729 updates result in frames with no pixel change, but consume a major chunk (84%) of the app's graphics energy. This suggests the app may be updating the seekbar view too frequently. Clicking on the first seekbar entry will bring the user to the detailed UI updates page for this view, as shown in FIG. 8. The call stacks directly pinpoint the classes and methods that are responsible for UI updates on the view. With such information, developers can easily fix the issue, e.g., by reducing the frequency of the setProgress( ) UI call in SPOTIFY's case. Finally, FIGS. 9*a* and 9*b* show the third output format of GfxDoctor, the energy timeline for the two traces for two apps.

To understand energy usage, one needs to understand the nature of energy bugs. We identify apps with graphics energy bugs by checking whether they have a significant number of dots in the "energy bug region" in their UI updates scatter plot, and for each bug instance, we investigate its cause by studying the classes and methods in the corresponding UI update call stacks provided in the table output. Once we understand the cause of a bug, we fix the bug by decompiling and recompiling the app using Apktool, and quantify the energy impact of the bug by measuring the whole phone energy drain in running the app before and after fixing. To measure the energy, we run both versions of the app on an unmodified framework, for 1 minute each, and report the total energy drain measured by a Monsoon power monitor. We use a Nexus 6 with ANDROID 5.1 as the testing device, with all other apps uninstalled and background activities disabled. We keep the phone's screen on during testing and fix the screen brightness at ⅓ of the highest brightness. Network access is via a WiFi with excellent signal and we disable the cellular network. Each measurement is repeated 3 times and we report the average result.

Figure 10:
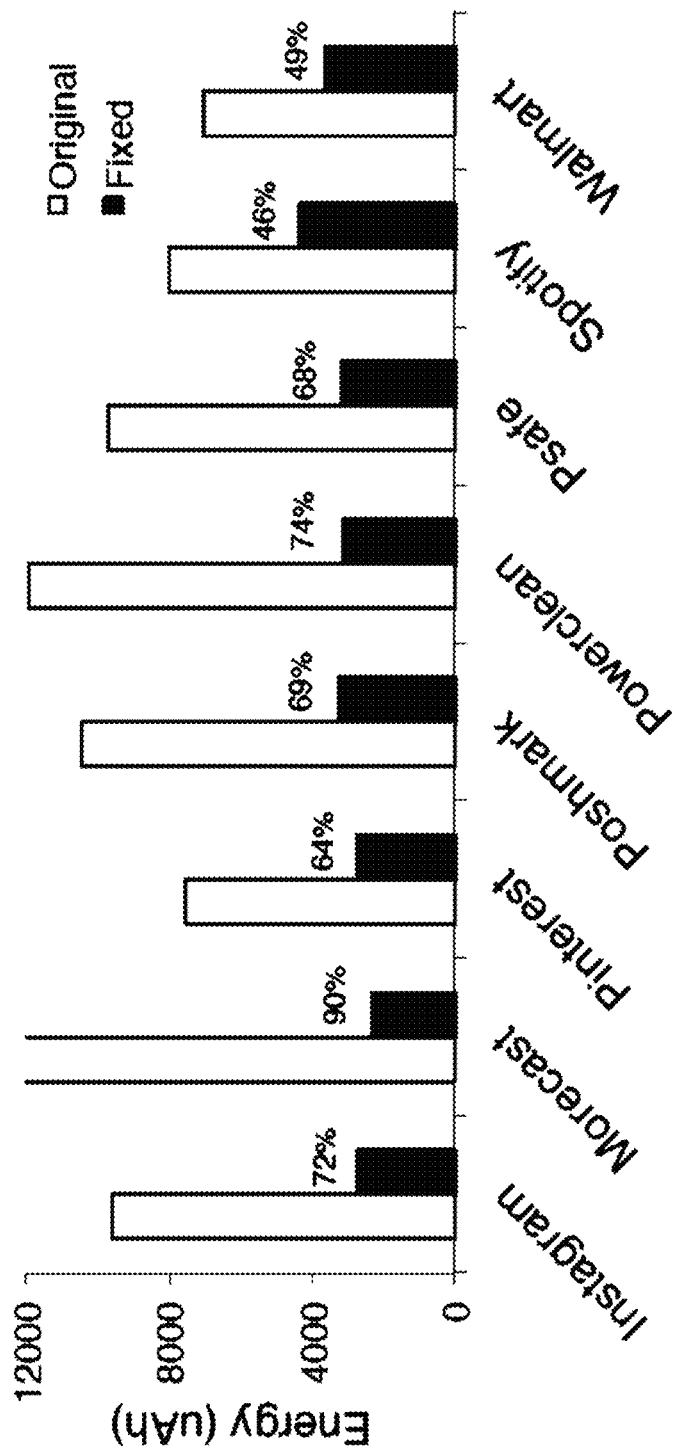
FIG. 10 is a bar graph showing energy in μAh for various apps for 1 minute of app energy showing before and after fixing identified energy bugs.
Figure 11A:
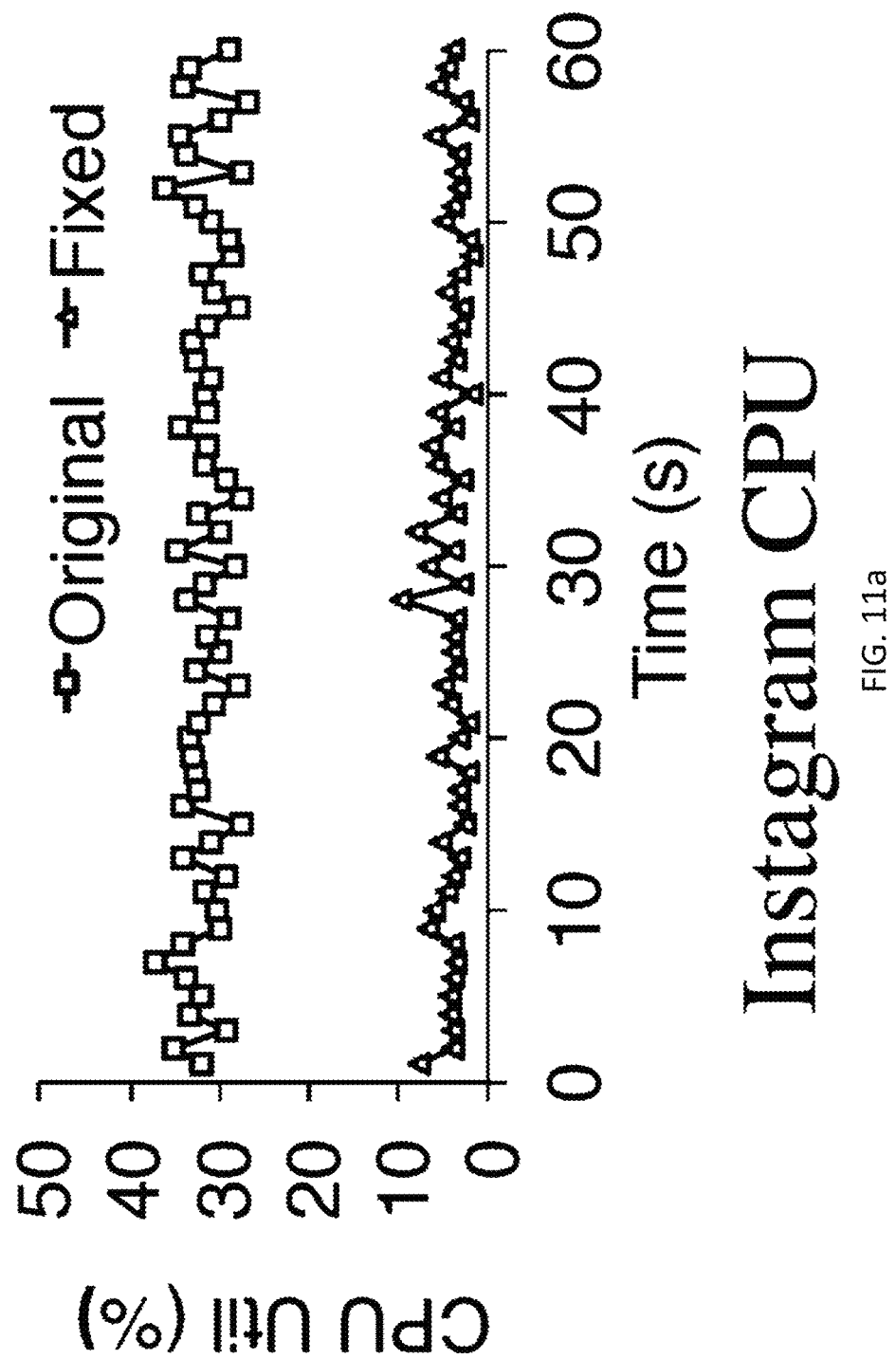
FIGS. 11a, 11b, 11c, and 11d are CPU and GPU utilization before and after fixing energy bugs, where 11a is for INSTAGRAM CPU, 11b is for PINTEREST CPU, 11c is for INSTAGRAM GPU, and 11d is for PINTEREST GPU.
Figure 11B:
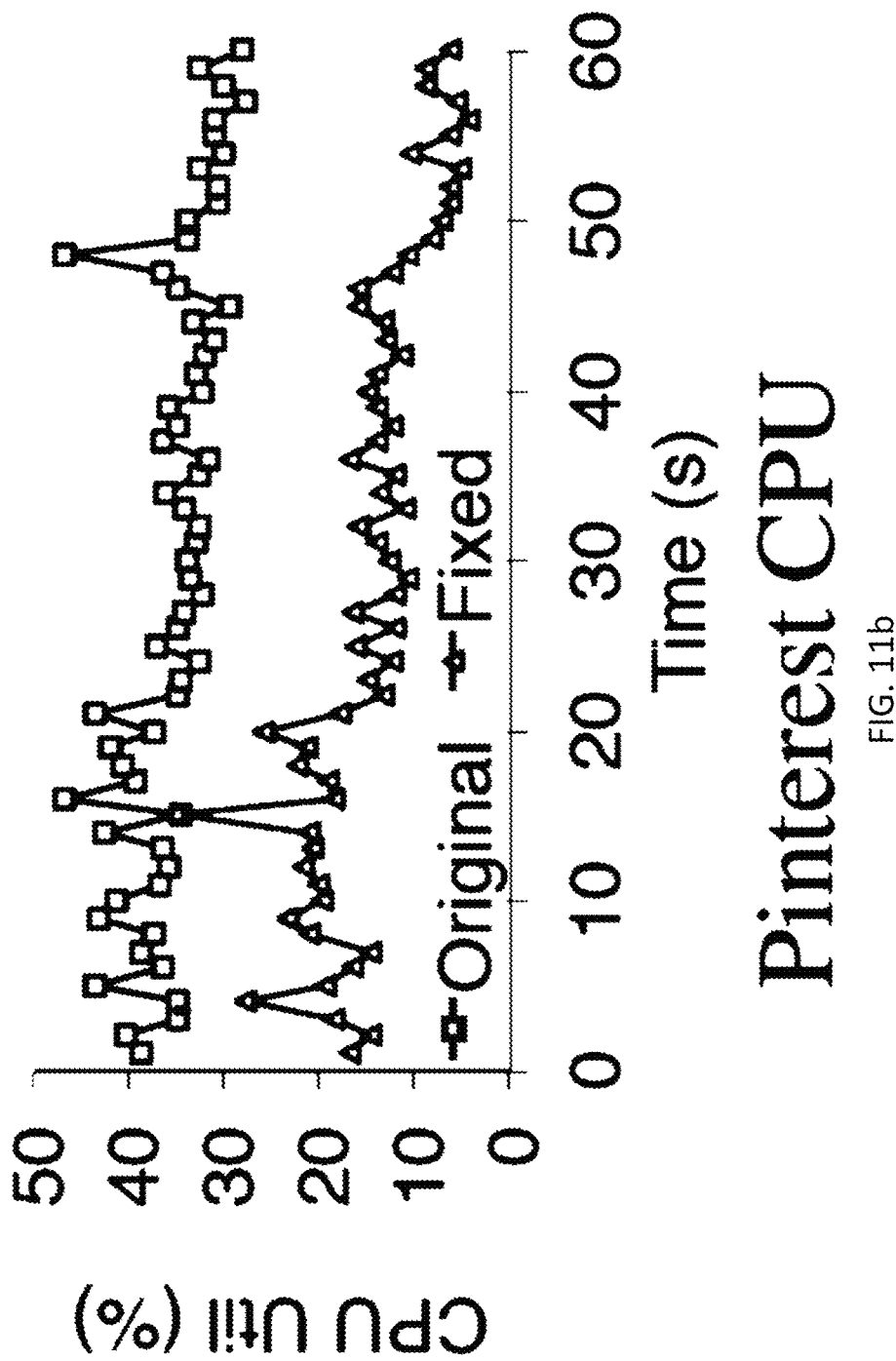
Figure 11C:
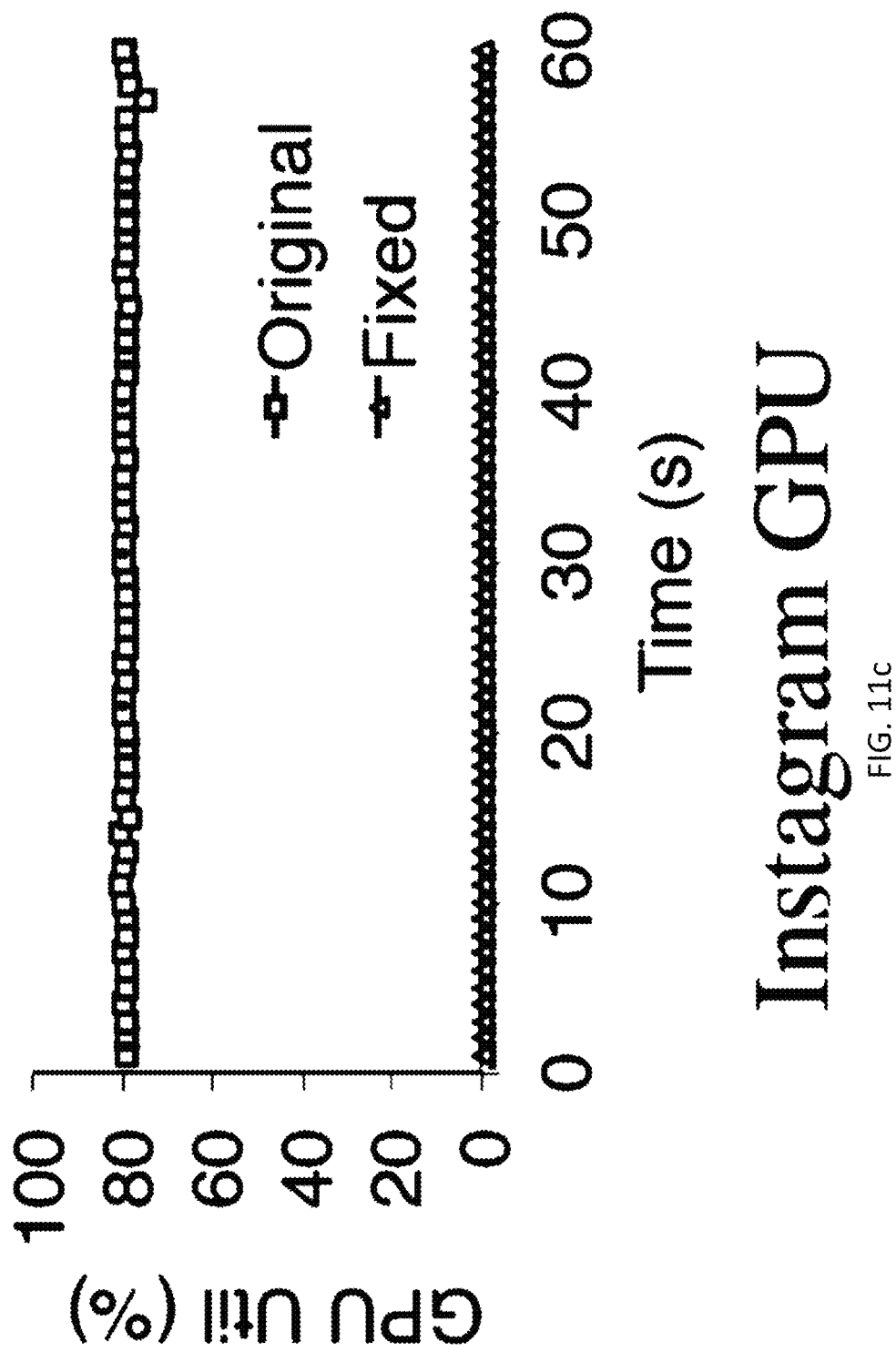
Figure 11D:
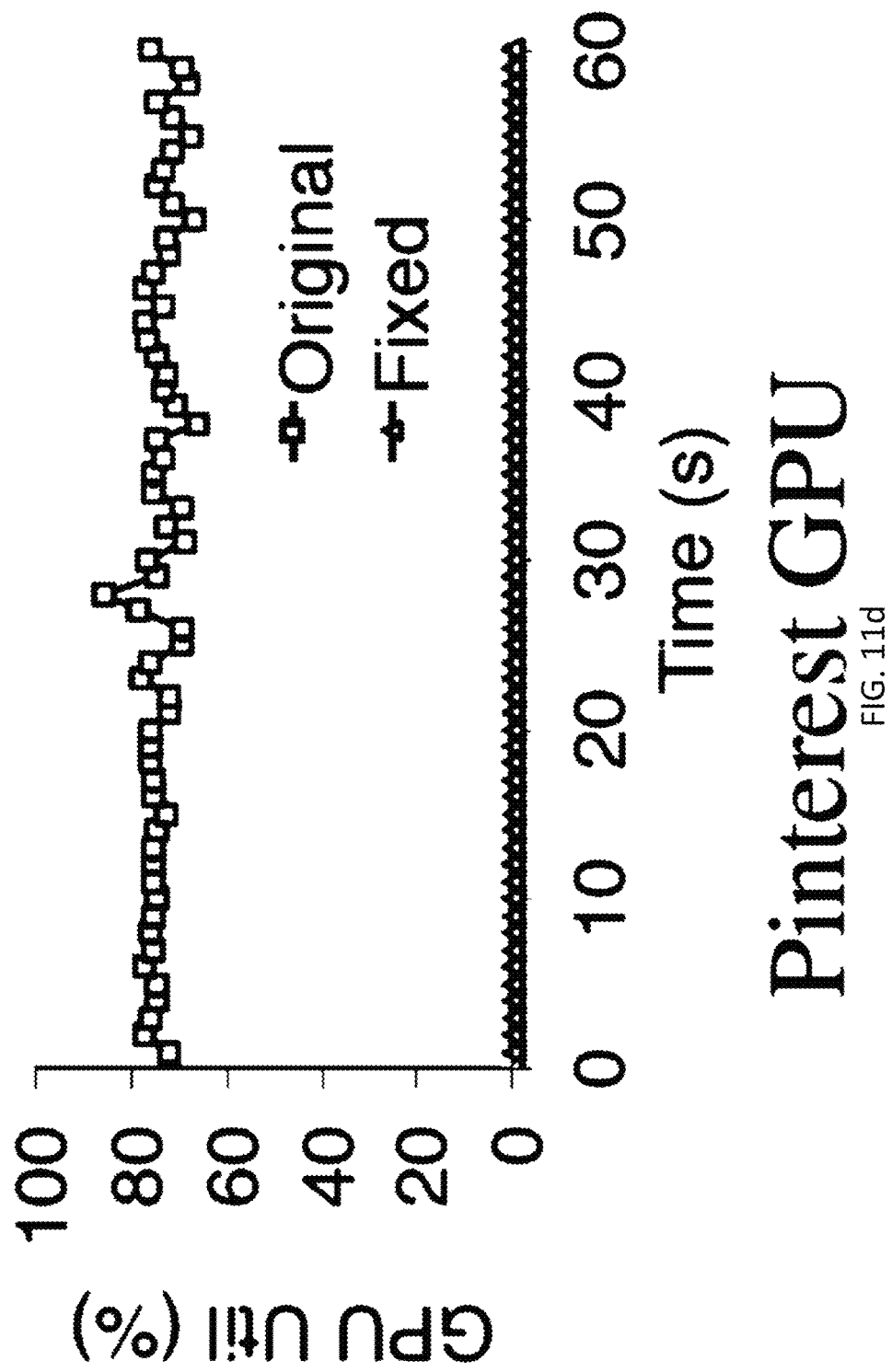

Out of the 30 apps, the method of the present disclosure identified 9 graphics energy bug instances in 8 apps, as listed in Table 3. Based on the causes, we categorize the bugs into three types, as shown in Table 4. FIG. 10 shows the 1-minute energy drain of the 8 apps with and without the energy bugs. We see that graphics energy bugs have significant impact on the total energy drain of the app, as removing them reduces the app energy drain by 46% to 90%. To understand the reason for the excessive energy drain brought by the bug, we plot two impacted apps' CPU and GPU utilization before and after fixing in FIGS. 11*a*, 11*b*, 11*c*, 11*d* for two apps. We see that the bugs cause apps to use significantly more CPU and GPU resources due to continuous frame rendering. On average, the bugs cause apps to incur 24% higher CPU utilization and 77% higher GPU utilization (both in absolute).

TABLE 3

Apps with graphics energy bugs and their related activities, views, and the line of changes to fix the bug

| App | Bug Type | Related activity | Related view | LOC of bug fix |
|---|---|---|---|---|
| Instagram 9.3.0 | 1 | MainTabActivity | SpinerImageView | +51 |
| Morecast 3.0.6 | 1 | HomeActivity | ProgresBar | +1 |
| Pinterest 5.22.0 | 1 | PinterestActivity | LoadingView | +51 |
| Poshmark 2.48.02 | 2 | PMContainerAcivity | LabelledEditText | +1 |
| Power Clean 2.8.7.18 | 2 | ApkManagerActivity | ButtonFlat | −1 |
| Psafe total 3.6.11 | 3 | HomeActivity | ImageView | +1 |
| Spotify 6.1.0 | 1, 3 | PlayerActivity | CancellableSeekBar | −1 + 1 |
| Walmart 4.0.3 | 2 | HomeActivity | OverscanImageView | −2 |

TABLE 4

Graphics energy bugs.

| Bug Type | Bug name | Bug description |
|---|---|---|
| 1 | Invisible animation | App has animations invisible to users |
| 2 | Drawing loop | App view indefinitely re-draws itself |
| 3 | No pixel update | App issues UI updates with no pixel change |

The UI energy bugs fall into one of several categories. The first type is the Invisible animation bugs. Invisible animation bugs happen when apps spend energy on rendering animations that are not visible to users. As a result, the app continuously generates frames with identical content and wastes energy. Example app: Morecast. Morecast is a popular weather app with more than 5 million downloads in Google Play. In its main activity, it has 4 buttons that lead to 4 different tabs, including a "community" tab. When the user clicks the community tab button, the app will display a spinning progress bar animation to indicate the app is loading data. When the data loading is done, the spinning animation disappears and the app displays the content of the community tab. In a test of loading and viewing the community tab, GfxDoctor reveals that out of total 1578 app frames, the spinning progress bar animation is responsible for 1472 frames, out of which 1392 frames have 0 pixel changes. Energy-wise, the spinning progress bar animation consumes 87% of the graphics energy, out of which 95% is spent on generating the 1392 identical frames.

We further check the app's UI updates on the progress bar animation. It turns out the app starts the animation with ProgressBar.setVisibility(VISIBLE), and sets it to invisible with a helper method crossfadeViews( ) in the app's Utils class. The crossfadeViews( )method sets a view to invisible by gradually changing the view's transparency from not transparent to fully transparent through the View.setAlpha( ) API, thus creating a fading effect. This approach works well for static views such as texts or images, but creates an energy bug in animations. The reason is to stop a progress bar animation, developers have to use the setVisibility( ) API to set its visibility to INVISIBLE or GONE; just setting the progress bar to fully transparent using setAlpha( ) does not stop its animation. To fix the bug, we simply need to add a call to ProgressBar.setVisibility(INVISIBLE) after the crossfadeView( )method to stop the progress bar animation after it becomes fully transparent.

The second type of UI energy bug is drawing loop bugs. The drawing loop bug happens when a view has buggy drawing code so that it endlessly re-draws itself even when its content is not changing. Consequently, the app keeps generating frames of the same content each time the view re-draws itself, thus wasting energy. This usually happens in app provided UI widgets whose drawing codes are written by the app or third-party developers. Example app: Power Clean. The Power Clean app is a popular device cleaner and performance booster app with more than 50 million downloads in Google Play. The app provides a customized button implementation called ButtonFlat by extending the default Button class in ANDROID. Specifically, the ButtonFlat class over-rides the onDraw( )method of the Button class to customize the button's appearance. The onDraw( )method is a callback that will be invoked by the framework during frame rendering to generate drawing commands for the view. The bug happens during frame rendering when the ButtonFlat's onDraw( )method is invoked, in addition to generating drawing commands for the button, it also invalidates the button by marking it as "dirty" and schedules a new frame rendering even when the button has no content update. Since a new frame is scheduled, upon the next Vsync signal, the framework will start rendering of a new frame; and since the button is marked as "dirty", the framework will invoke its onDraw( )method during frame rendering to generate drawing commands. When the ButtonFlat's onDraw( ) is invoked, it again marks the button as "dirty" and schedules another frame rendering. At the next Vsync signal, the above process repeats. Essentially, it forms a loop and causes the framework to endlessly call ButtonFlat's onDraw( )method and generate new frames of identical content, inflating the whole phone's energy drain by 4×. To fix the bug, we simply need to remove the invalidate( ) call from ButtonFlat's onDraw( )method.

The third type of UI energy bug is related to no pixel update bug. This bug happens when an app issues UI updates that result in no pixel changes on the screen. As a result, the app generates new frames with identical contents and hence wastes energy. One may ask, why would developers issue UI updates if they do not change the screen content? The reason is that ANDROID graphics is a highly complicated system and has to cover hundreds of different phone or tablet models with different resolutions and screen settings. As such, it is very hard for developers to predict what change an UI update will make to the screen content.

The SPOTIFY app exhibits such a bug. GfxDoctor shows that 83% of frames generated by the app during music streaming has no visual change, which consumes 84% of the graphics energy. The UI updates corresponding to those frames are ProgressBar.setProgress( ) which updates the music player progress bar. This indicates that the app is making many setProgress( ) calls that result in no pixel changes. By checking the decompiled source code of SPOTIFY, we find that the app posts a frame callback every 16 ms to update the progress bar. For a typical song of 3 minute duration, 16 ms equals about 0.01% of its total duration. Even on a high-end phone with 2560×1440 screen resolution, the progress bar is about 1000 pixels in length, and hence on average each progress bar update results in about 0.1 pixel change. Since the phone cannot display any pixel change less than 1 pixel, most progress bar updates will result in no pixel change at all. However, despite no pixel change, such UI updates will still trigger the frame rendering pipeline and thus incur high energy cost. In contrast, the PANDORA app updates its progress bar once every second. As a result, both the number of frames and UI energy cost of PANDORA are much lower than those of SPOTIFY.

We fixed the bug by changing the frequency of the progress bar update from every 16 ms to every 160 ms in the source code, so that each progress bar update results in about 1 pixel change for a 3-minute song on a 2560×1440 resolution screen. In practice, developers can further tune the update frequency to achieve better UI performance-energy tradeoff.

The present disclosure has been described in detail with particular reference to certain preferred aspects thereof, but it will be understood that variations, combinations, and modifications can be effected by a person of ordinary skill in the art within the spirit and scope of the invention.

The invention claimed is:

1. A system for profiling energy usage in graphics user interfaces (UI) in handheld mobile devices, comprising:
 a processing unit configured to:
  quantify during run time a central processing unit (CPU) energy drain of each UI update, comprising:
  identify method invocations at all layers of a UI rendering software stack corresponding to each UI update,
  log energy usage of the CPU corresponding to each method invocation,
  calculate the CPU energy drain by an UI update by adding up the CPU energy usage by all method invocations corresponding to the UI update,
  quantify during run time a graphics processing unit (GPU) energy drain of each UI update,
  quantify during run time number of pixels changed due to each UI update, and
  identify during run time an UI update that results in one or both of the CPU energy drain and the GPU energy drain but results in no pixel changes to a displayed frame as a graphics energy bug.

2. The system of claim 1, wherein the identify method invocations at all the layers of the UI rendering software stack corresponding to each UI update comprising:
track asynchronous dependence between an UI update and corresponding callbacks across all the layers of the UI rendering software stack comprising:
assign a unique view-frame identification (ID) corresponding to the view in the displayed frame being changed by the UI update,
log the view-frame ID when the UI update is called, when a callback is posted, and when any callback is invoked, and
in post processing match all the callbacks with the same view-frame ID with the corresponding UI update.

3. The system of claim 1, the processing unit further adapted to:
generate an error message reporting the graphics energy bug.

4. The system of claim 3, the processing unit further adapted to:
store the error message in a non-transitory memory medium.

5. A system for profiling energy usage in graphics user interfaces (UI) in handheld mobile devices, comprising:
a processing unit adapted to:
quantify during run time a central processing unit (CPU) energy drain of each UI update, p1 quantify during run time a graphics processing unit (GPU) energy drain of each UI update, comprising:
track and post processing information flow across a corresponding GPU by using an OpenGL record-and-replay method comprising:
label drawing commands and OpenGL calls generated at each layer of UI rendering software stack with view-frame IDs,
record OpenGL calls along with their view-frame IDs (but not a displayed frame) during energy profiling,
log the GPU energy drain during each rendering interval,
in post processing, split the GPU energy drain per rendering interval among groups of OpenGL calls with different view-frame ID labels and hence different UI updates to the same displayed frame,
quantify during run time number of pixels changed due to each UI update, and
identify during run time an UI update that results in one or both of the CPU energy drain and the GPU energy drain but results in no pixel changes to the displayed frame as a graphics energy bug.

6. The system of claim 5, the processing unit further adapted to:
generate an error message reporting the graphics energy bug.

7. The system of claim 6, the processing unit further adapted to:
store the error message in a non-transitory memory medium.

8. A system for profiling energy usage in graphics user interfaces (UI) in handheld mobile devices, comprising:
a processing unit adapted to:
quantify during run time a central processing unit (CPU) energy drain of each UI update, quantify during run time a graphics processing unit (GPU) energy drain of each UI update,
quantify during run time number of pixels changed due to each UI update, comprising:
track and post processing information flow across a corresponding GPU by using a second OpenGL record-and-replay method, comprising:
label drawing commands and OpenGL calls generated at each layer of UI rendering software stack with view-frame IDs,
record OpenGL calls along with their view-frame IDs (but not a displayed frame) during energy profiling,
in post processing, reconstruct the displayed frames by replaying each group of OpenGL calls with the same view-frame ID on the GPU, and
compare the displayed frames to account for the number of pixels changed due to each group of OpenGL calls with a unique view-frame ID and hence the corresponding UI update, and
identify during run time an UI update that results in one or both of the CPU energy drain and the GPU energy drain energy drain but results in no pixel changes to the displayed frame as a graphics energy bug.

9. The system of claim 8, the processing system further adapted to:
generate an error message reporting the graphics energy bug.

10. The system of claim 9, the processing system further adapted to:
store the error message in a non-transitory memory medium.

* * * * *